United States Patent [19]

Clark

[11] Patent Number: 5,088,088

[45] Date of Patent: * Feb. 11, 1992

[54] DYE-POLYMER OPTICAL DATA STORAGE MEDIA WITH IMPROVED RECORDING SENSITIVITY

[75] Inventor: Bryan K. Clark, Sunnyvale, Calif.

[73] Assignee: Tandy Corporation, Ft. Worth, Tex.

[*] Notice: The portion of the term of this patent subsequent to Nov. 7, 2006 has been disclaimed.

[21] Appl. No.: 398,803

[22] Filed: Aug. 25, 1989

Related U.S. Application Data

[63] Continuation of Ser. No. 152,690, Feb. 5, 1988, Pat. No. 4,879,709.

[51] Int. Cl.$^5$ ............................................. G11B 7/24
[52] U.S. Cl. .................... 369/284; 369/286; 369/288; 369/275.4; 346/135.1
[58] Field of Search ................ 369/100, 275.1, 275.5, 369/283, 284, 286, 275.2, 275.3, 275.4, 288; 346/135.1; 430/19, 945

[56] References Cited

U.S. PATENT DOCUMENTS

| | | | |
|---|---|---|---|
| 4,398,203 | 8/1983 | Cornet | 346/135.1 |
| 4,430,659 | 2/1984 | Maffitt et al. | 346/135.1 |
| 4,527,173 | 7/1985 | Gupta et al. | 346/135.1 |
| 4,578,788 | 3/1986 | Ahn et al. | 369/286 X |
| 4,645,712 | 2/1987 | Ishigaki et al. | 428/433 |
| 4,651,172 | 3/1987 | Watanabe et al. | 346/135.1 |
| 4,673,626 | 6/1987 | Takeda et al. | 430/14 |
| 4,680,458 | 7/1987 | Drexler | 235/487 |
| 4,709,363 | 11/1987 | Dirks et al. | 369/288 X |
| 4,710,452 | 12/1987 | Raychaudhuri | 430/495 |
| 4,719,615 | 1/1988 | Feyrer et al. | 369/284 |
| 4,773,059 | 9/1988 | Minemura et al. | 369/100 |
| 4,780,867 | 10/1988 | Lind et al. | 369/100 |
| 4,798,785 | 1/1989 | Pan et al. | 430/495 |
| 4,825,430 | 4/1989 | Halter et al. | 369/284 |
| 4,852,075 | 7/1989 | Feyrer et al. | 369/100 |
| 4,852,077 | 7/1989 | Clark et al. | 369/284 |
| 4,879,709 | 11/1989 | Clark | 369/284 |

FOREIGN PATENT DOCUMENTS

| | | |
|---|---|---|
| 1229410 | 11/1987 | Canada. |
| 0136070 | 8/1984 | European Pat. Off. . |
| 0263641 | 4/1988 | European Pat. Off. . |
| 0338776 | 10/1989 | European Pat. Off. . |

OTHER PUBLICATIONS

Watkinson, *The Art of Digital Audio*, Chapter 13, pp. 440-486, Focal Press, 1988.
Hartman et al., "Erasable Bilayer Dye-Polymer Optical Recording Medium", pp. 155-158.
Miyaoka, "Digital Audio is Compact and Rugged", *IEEE Spectrum* (1984), pp. 35-39.

*Primary Examiner*—Stuart S. Levy
*Assistant Examiner*—Hoa Nguyen
*Attorney, Agent, or Firm*—Townsend and Townsend

[57] ABSTRACT

An improvement is disclosed relating to optical data storage media having two thermo-optically active layers which absorb light at distinct wavelengths—an expansion layer in which data appear as bulges formed upon the absorption of light, and a retention layer which fixes such bulges in place until it is selectively heated to a rubbery state permitting relaxation of the expansion layer and the consequent disappearance of the bulges. In accordance with the improvement, the retention layer is modified so that it absorbs a controlled amount of light at the wavelength which is absorbed by the expansion layer, with the result that it absorbs light at both wavelengths rather than just one. Direct heating of both layers by light absorption during recordation, and accordingly a faster recordation response, are thus achieved.

3 Claims, 1 Drawing Sheet

U.S. Patent
Feb. 11, 1992
5,088,088
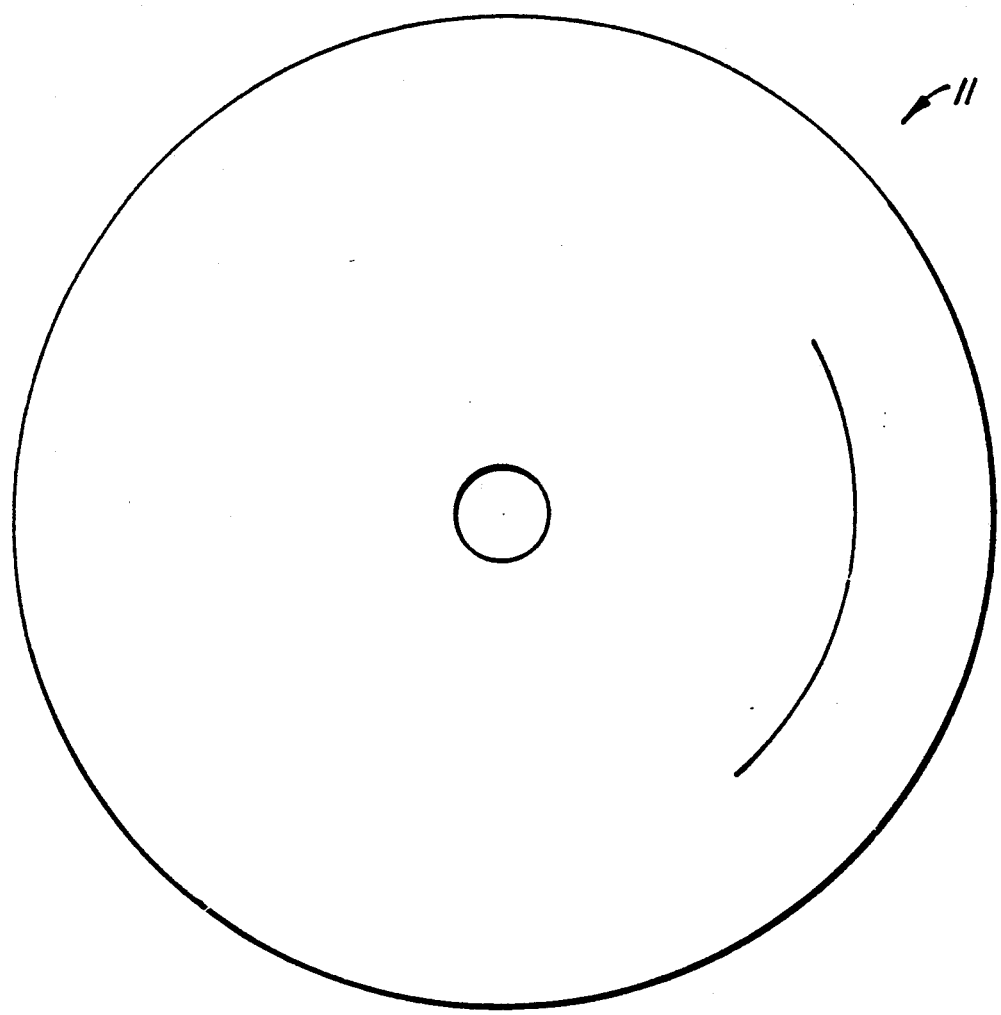
FIG._1.
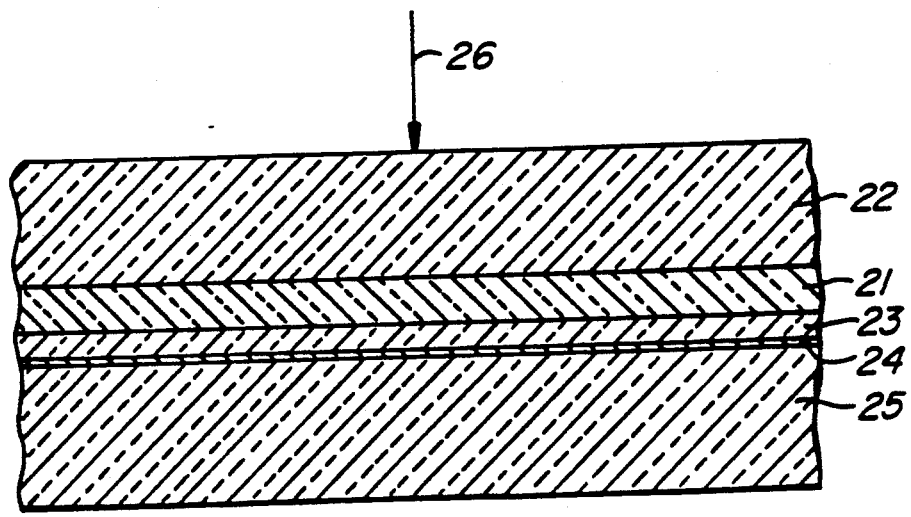
FIG._2.

DYE-POLYMER OPTICAL DATA STORAGE MEDIA WITH IMPROVED RECORDING SENSITIVITY

This is a continuation of application Ser. No. 152,690 filed Feb. 5, 1988 now U.S. Pat. No. 4,879,709.

This invention relates to optical data storage media on which data are recorded by response to the thermal effects of absorbed light. In particular, this invention is directed to such media in which data marks appear as bulges in an expansion layer formed upon the absorption of light, and such bulges are fixed by a retention layer until the latter is selectively heated whereupon it softens to permit the bulges to retract, thereby erasing the marks.

BACKGROUND AND SUMMARY OF THE INVENTION

One of the various types of optical memory technologies currently in existence is one which is both recordable and erasable and operates on the principle of two thermo-optically active layers which absorb light at different wavelengths and respond to the resulting temperature increase in a reversible manner. The response of one such layer is expansion, while the response of the other is the transition from a glassy state to a rubbery state. The coupling of these two layers together results in the second layer resisting forces exerted by the first when the second layer is in its glassy state, and accommodating such forces when in its rubbery state.

One medium in which this principle is applied is described in European Patent Application Publication No. 136070, published on Apr. 3, 1985, entitled "Erasable Optical Data Storage Medium and Method and Apparatus for Recording Data on the Medium" (Optical Data, Inc.). In this medium, the two thermo-optically active layers, which are referred to herein as the "expansion" and "retention" layers, respectively, are both supported on a rigid substrate.

Data is recorded by heating the expansion layer by absorption of light from a laser beam at a "record" wavelength to cause the expansion layer to expand away from the substrate and form a protrusion or "bump" extending into the retention layer. While this is occurring, the retention layer receives heat from the expansion layer by conduction and rises in temperature above its glass transition temperature so that it can deform to accommodate the bump. The beam is then turned off and the retention layer cools quickly to its glassy state before the bump levels out, thereby fixing the bump. Reading or playback of the data is achieved by a low intensity "read" beam which is focused on the partially reflecting interface between the retention layer and air. When the read beam encounters the bump, some of the reflected light is scattered, while other portions of the reflected light destructively interfere with reflected light from non-bump areas. The resulting drop in intensity is registered by the detector. Removal of the bump to erase the data is achieved by a second laser beam at an "erase" wavelength which is absorbed by the retention layer. This beam heats the retention layer alone to a rubbery state where its viscoelastic forces and those of the expansion layer return it to its original flat configuration.

A variation on this system is disclosed in U.S. Pat. Application Serial No. 153,288, filed on even date herewith, entitled "Optical Data Storage Media For Substrate Incident Recording," inventors B. Clark, J. Finegan, and R. Guerra, commonly assigned herewith. In this variation, a reflective layer which deforms to conform to the data marks is included in addition to the expansion and retention layers. The reflective layer reflects light back through the expansion layer to provide a double pass during data recordation for greater absorption and mark focusing. During playback, focusing is done on the reflective layer rather than an air-retention layer interface, and a higher degree of reflection is achieved.

In both of these systems, the expansion and retention layers are independently absorptive due to dyes which are selective for the record and erase beams, respectively. Accordingly, the retention layer absorbs light only when the erase beam is on. During recordation, the heating of the retention layer to convert it to the rubbery state is achieved by conduction of heat from the expansion layer. The time required for such conductive heat transfer is a limitation on both the speed and the sensitivity of systems of this type.

The present invention provides for light absorption in the retention layer during recordation, in addition to its light absorption during erasure. The result is direct heating of both the expansion and retention layers during recordation, lessening the need for heat transfer between these layers by conduction, and thereby quickening the response of the medium to the record beam. This innovation is applicable to media both with and without a reflective layer.

BRIEF DESCRIPTION OF THE DRAWINGS

FIG. 1 illustrates an optical storage medium in top view; and

FIG. 2 illustrates the optical storage medium shown in FIG. 1 in cross-section.

DETAILED DESCRIPTION OF THE INVENTION AND PREFERRED EMBODIMENTS

FIGS. 1 and 2 illustrate an optical storage medium 11 in accordance with one embodiment of the invention.

Absorption of light 26 by the retention layer 23 during recordation in accordance with the present invention may achieved in the same manner as light is absorbed by the expansion layer 21 during recordation and the retention layer during erasure. Since the selective absorptivity of these layers is generally achieved by the inclusion of distinctive dyes, a controlled amount of the expansion layer dye may be included in the retention layer in addition to the dye already present therein for response to the erase beam.

The degree to which the retention layer absorbs light from the recordation beam will be subject to certain considerations. In certain dye-polymer media, for example, the recordation beam must pass through the retention layer before reaching the expansion layer. Furthermore, where reflection is present, either at an interface between adjacent layers or at the surface of a reflective layer, the recordation beam is given a double pass through the expansion layer for a more uniform column of absorption. It is important in these cases that the retention layer be only partially absorptive of the recordation beam to permit the latter to pass through to the expansion layer. It is also important in such cases that the retention layer permit sufficient light to pass through it to the expansion layer to provide the latter with the desired recordation sensitivity. With these considerations in mind, the retention layer will generally be at least about 15% absorptive of light from the recordation beam passing through it in a single pass. In preferred embodiments, the absorptivity is from about 151% to about 50% in a single pass. This is independent of the retention layer's absorptivity of the erase beam.

Other parameters of the media may vary widely. The following is a description of these parameters in certain preferred embodiments.

The expansion layer is formed of a material which is absorptive of light at the wavelength of the record beam. As stated above, in certain preferred embodiments, the expansion layer is only partially absorptive at this wavelength, thereby permitting a double pass of the record beam. The degree of absorptivity may vary, although in general, a single pass absorption of about 25% or greater will provide the best results. In preferred embodiments, the single pass absorption is from about 25% to about 60%. A double pass absorption of around 50% helps to create a column of nearly constant temperature material in the expansion layer. eliminating high thermal gradients through the expansion layer that occur with single pass recording. This improves mark formation and definition. In addition, the expansion layer is at least partially transmissive of light at the wavelength of the erase beam. Although this may vary widely as well, in most applications a transmissivity of at least about 60%. preferably at least about 80%, at this wavelength will provide the best results.

The expansion layer is further categorized by a high coefficient of thermal expansion, particularly when compared to the other layers of the medium. Coefficients above about $1 \times 10^{-4}$ ° $C^{-1}$ preferred, with those greater than about $5 \times 10^{-4}$ ° $C^{-1}$ particularly preferred. and those greater than about $7.5 \times 10^{-4}$° $C^{-1}$ most preferred.

In addition, the expansion layer material is rubbery at ambient temperature, i.e.. having a high coefficient of elasticity, to the extent that it will expand readily during recordation without exceeding its upper expansive limit. When at room temperature, the expansion layer material is near or above its glass transition temperature, which is preferably below 30° C.

As stated above, the retention layer is absorptive of light at the wavelength of the erase beam. The wavelengths of the record and erase beams differ in a nonoverlapping manner. The absorptivity of light by the retention layer at the erase beam wavelength is preferably at least about 40% (single pass). and more preferably at least about 50%. In addition. the retention layer material is transmissive of light at the wavelength of the record beam, preferably at least about 60%.

The retention layer material has a glass transition temperature which is above ambient temperature. This may be below the temperature reached by the expansion layer during data recordation. With direct heating of the retention layer, however (by absorption of light from the record beam). this need not be so. In general. this glass transition temperature will range from about 50° C. to about 200° C. preferably from about 75° C. to about 125° C. When above the glass transition temperature. the material is rubbery with a high enough elasticity. sufficient to permit it to deform to the contour of the distortion formed in the expansion layer without exceeding its elasticity limit.

In further embodiments of the invention, the retention layer has a high thermal conductivity, causing it to rise in temperature above its glass transition temperature through conduction from the expansion layer as well as by direct heating. The high thermal conductivity also serves to dissipate the heat outward quickly for purposes of cooling the retention layer back to its glassy state after the pit in the expansion layer has been formed, and before the expansion layer returns to its nonexpanded state. In most applications. the thermal conductivity will be at least about $2.5 \times 10^{-4}$ cal/cm$^2$/° C./sec/cm. preferably at least about $5 \times 10^{-4}$ The reflective layer 24 present in certain embodiments of the invention serves to reflect light back through the expansion layer for purposes of recordation, and also for purposes of data detection. The reflective layer thus reflects at least about 25% of the light striking it, preferably at least about 75% and most preferably at least about 85% of the light striking it during both recordation and reading. The reflective layer is also deformable so that it conforms to the shape of the pit representing the recorded data for purposes of light scattering.

Certain embodiments of the invention also include a protective layer 25 on the underside of the pits to protect them from damage due to contact with external objects. Characteristic of the protective layer is its compliancy, by which it deforms to permit the bumps which are the undersides of the pits to protrude into it. In addition, the compliant layer is relatively thick when compared to the expansion, retention and reflective layers, such that the bumps are not transmitted through the protective layer to its outer surface. It is also preferred that the protective layer have a high thermal conductivity to enable it to function as a heat sink for purposes of rapid cooling of the retention layer immediately after formation of the bumps. In most applications, a thermal conductivity of at least about $5 \times 10^{-4}$ cal/cm2/° C./sec/cm will provide the best results.

The various layers are arranged on the substrate in accordance with the system for which the medium is designed. In general, the expansion layer will be located adjacent to the substrate 22, and the retention layer (as well as the reflective layer in media where one is included) is on the side of the expansion layer away from the substrate. The substrate itself is formed of a rigid transparent material which permits substantially full transmission of light at all three wavelengths—record, read and erase. The substrate is sufficiently thick and rigid to provide structural integrity to the medium, and does not deform in response to pressure caused by expansive forces in the expansion layer. Bulges in the expansion layer caused by its thermal expansion upon absorption of the record beam protrude away from the substrate due to the substrate's rigidity. With this layer arrangement, the bulges protrude into the retention and reflective layers, causing their deformation as described above.

The thicknesses of the various layers will be selected in accordance with the optics of the system. including the record, read and erase functions. For instance, in order to maintain the minimum mark size during data recordation with greatest write sensitivity during recording, the laser beam should be maintained as small as possible as it passes through the expansion layer. Accordingly, most of the expansion layer should be within the focal depth of the record beam. For recording systems having optical parameters similar to those found in standard compact disk players, the record beam is diffraction limited and has a focal length of approximately 1.0–2.0 microns.

In such cases, best results can be obtained with an expansion layer having a thickness of approximately 0.5 to 1.5 microns. preferably 1.0 micron or less. Furthermore, in cases where the retention layer lies between the expansion layer and the reflective layer, the retention layer should be as thin as possible. since it will lie in the center of the focal depth. Accordingly a retention layer of approximately 0.25 to 1.0 micron is preferred, with approximately 0.5 micron to 0.75 micron most preferred. In general, however. the expansion and retention layers will be as thin as possible while still retaining their expandable and retentive characters respectively.

The substrate and the protective layers are considerably thicker, the substrate layer being on the order of 1 millimeter or more and the protective layer being on the order of tens of microns, in view of their respective functions—i.e.. the substrate must be thick enough to impart rigidity to the medium, and the protective layer must be thick enough to protect the data protrusions from external abuse.

The materials used in forming the layers will be selected on the basis of the properties indicated above. i.e.. transparency, reflectivity, absorptivity. glass transition temperature, elasticity, and thermal expansivity. The preferred materials for all layers except the reflective layer are amorphous polymers. Examples of such materials are rubbers such as butyl rubbers, silicone rubbers, natural rubbers and styrene-butadiene rubbers, polymers such as cellulose acetate, cellulose acetate-butyrate, polystyrene, polysulfonamide, polycarbonate, cellulose nitrate, poly(ethylmethacrylate). poly(vinyl butyral). aromatic polyesters. polyamides, acrylic polymers, polyvinyl acetate, silicone resins, alkyd resins, styrene-butadiene copolymers. vinyl chloride-vinyl acetate copolymers, nitrocellulose, ethylcellulose and polyvinyl alcohol; and substances such as gelatin glue, casein,egg albumin and dihydroabietyl alcohol. The expansion layer should be constructed from materials with high elasticity such as elastomers and polymers with elongations greater than 15%. Flexibilized epoxies with elongations from 15% to 130% and glass transition temperatures from below ambient temperature to 45° C. are particularly preferred. The retention layer should be constructed from material with relatively high glass transition temperatures. notably greater than 50° C. with elongation greater than 5%. Epoxies with glass transition temperatures of from 75° C. to 145° C. and elongation of 5% to 20% are particularly preferred.

The reflective layer when present may be formed of any reflective material which is sufficiently, elastic and malleable to conform to the bulges protruding from the expansion layer. The material should not unduly constrict bump formation and should not become substantially work hardened over the number of desired write and erase cycles. Examples of such materials are aluminum. copper, gold, and indium. Other examples are alloys. particularly eutectic alloys of bismuth with tin or cadmium.

The absorptive characteristics of the various layers may be imparted thereto in conventional ways, preferably by the inclusion of dyes or pigments selected to absorb at the appropriate wavelength. The target wavelengths are not critical, and can vary depending on the types of laser available for use. The wavelengths will generally be selected such that the record and erase wavelengths are distinct and nonoverlapping. Typical wavelengths for which lasers are available are 680nm, 780nm and 830nm. Examples of dyes or pigments which may be used are nigrosin blue, aniline blue. Calco Oil Blue, ultramarine blue, methylene blue chloride. Monastral Blue. Malachite Green Ozalate. Sudan Black BM. Tricon blue. Macrolex green G. DDCI-4 and IR26.

The additional absorptivity of the record beam by the retention layer may be achieved by the addition of a controlled amount of the expansion layer dye to the retention layer. The latter will therefore contain both dyes, and will be absorptive at both wavelengths. In certain cases, it will be advantageous to have a higher concentration of this dye in the retention layer than in the expansion layer, and in other cases a lower concentration.

The various layers are bonded together according to conventional techniques. It is preferred that adjacent layers be optically coupled to one another such that substantially all light propagated through one layer enters the adjacent layer. The exception is the reflective layer which reflects a major portion of the light incident upon it.

The media of the present invention may be fabricated in accordance with conventional techniques. whereby the various layers are applied in succession by coating over a substrate. Knife spread techniques. spin coating techniques and metal vapor deposition are examples of techniques which may be used.

The foregoing is offered primarily for purposes of illustration. It will be readily apparent to those skilled in the art that variations in the materials. their physical arrangements, and the various system parameters described herein may be introduced without departing from the spirit and scope of the invention.

What is claimed is:

1. An optical data storage medium comprising:
   a rigid substrate;
   an expansion layer joined on one side to said rigid substrate, said expansion layer being absorptive of light at a first wavelength and reversibly expandable thereupon; and
   a retention layer joined to said expansion layer on the side opposite said rigid substrate, said retention layer having a glass transition temperature above ambient temperature and thereby convertible between a rubbery state permitting deformation in response to forces exerted thereon by said expansion layer and a glassy state substantially nonresponsive to said forces, said retention layer having a first dye absorptive of light at a second wavelength distinct from said first wavelength and comprising a controlled amount of dye absorptive at said first wavelength, said retention layer at least about 15% absorptive of light at said first wavelength passing through it in a single pass, said controlled amount of dye quickening a response of said medium to said first wavelength.

2. An optical data storage medium comprising:
   a rigid substrate;
   an expansion layer joined on one side to said rigid substrate, said expansion layer being absorptive of light at a first wavelength, reversibly expandable thereupon, having a glass trannsition temperature below ambient temperature, and having a thickness of approximately 0.25 to 1.0 micron;
   a retention layer joined to said expansion layer on the side opposite said rigid substrate, said retention layer having a glass transition temperature between 50C. and 200° C. and thereby convertible between a rubbery state permitting deformation in response to forces exerted thereon by said expansion layer and a glassy state substantially nonresponsive to said forces, said retention layer being absorptive of light at a second wavelength distinct and nonoverlapping from said first wavelength and further at least 25% absorptive of light at said first wavelength passing through it in a single pass, and having a thickness of approximately 0.25 to 1.0 micron.

3. An optical data storage medium comprising:

a rigid substrate having a thickness of about 1 millimeter;

an expansion layer joined on one side to said rigid substrate, said expansion layer being absorptive of light at a first wavelength, reversibly expandable thereupon, and having a glass transition temperature below ambient temperature and a thickness of about 0.5 micron;

a retention layer joined to said expansion layer on the side opposite said rigid substrate, said retention layer having a glass transition temperature above ambient temperature and thereby convertible between a rubbery state permitting deformation in response to forces exerted thereon by said expansion layer and a glassy state substantially nonresponsive to said forces, said retention layer being absorptive of light at a second wavelength distinct from said first wavelength and further at least 25% absorptive of light at said first wavelength passing through it inn a single pass, and having a glass transition temperature of about 75 degrees Celsius and a thickness of about 0.5 micron, wherein said first wavelength is about 680 nm.

* * * * *